US011475765B2

(12) United States Patent
Grubwinkier

(10) Patent No.: US 11,475,765 B2
(45) Date of Patent: Oct. 18, 2022

(54) DETERMINING THE POSITION OF A LATER STOPPING POINT OF A VEHICLE

(71) Applicant: Vitesco Technologies GmbH, Hannover (DE)

(72) Inventor: Stefan Grubwinkier, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 151 days.

(21) Appl. No.: 16/754,841

(22) PCT Filed: Oct. 11, 2018

(86) PCT No.: PCT/EP2018/077717
§ 371 (c)(1),
(2) Date: Apr. 9, 2020

(87) PCT Pub. No.: WO2019/072959
PCT Pub. Date: Apr. 18, 2019

(65) Prior Publication Data
US 2021/0201667 A1    Jul. 1, 2021

(30) Foreign Application Priority Data

Oct. 12, 2017  (DE) ..................... 10 2017 218 222.9

(51) Int. Cl.
*G08G 1/01*     (2006.01)
*B60W 10/18*   (2012.01)
(Continued)

(52) U.S. Cl.
CPC .......... *G08G 1/0141* (2013.01); *B60W 10/18* (2013.01); *B60W 30/143* (2013.01);
(Continued)

(58) Field of Classification Search
CPC ............ B60W 40/04; B60W 2540/10; B60W 2540/12; B60W 2540/16; B60W 2540/18;
(Continued)

(56) References Cited

U.S. PATENT DOCUMENTS 8,452,523 B2    5/2013  Nitz et al. ...................... 701/112
9,646,428 B1 *  5/2017  Konrardy ............... G08B 25/08
(Continued)

FOREIGN PATENT DOCUMENTS

DE           101 39 595 A1   2/2003    ............. B60K 31/00
DE    10 2007 043 602 A1   3/2009    ............. G08G 1/096
(Continued)

OTHER PUBLICATIONS

German Office Action, Application No. 10 2017 218 222.9, 6 pages, dated Jul. 11, 2018.
(Continued)

*Primary Examiner* — Atul Trivedi
(74) *Attorney, Agent, or Firm* — Slayden Grubert Beard PLLC

(57) ABSTRACT

Various embodiments include a driver assistance system for determining the position of a stopping point of a vehicle at an infrastructure device comprising: a control unit; a communication device for receiving data from a server or from the infrastructure device; and a sensor arrangement for capturing vehicle data or environmental data. The control unit determines the location of the stopping point at the infrastructure device based at least in part on the data and the vehicle data or environmental data.

8 Claims, 2 Drawing Sheets

(51) Int. Cl.
*B60W 30/14* (2006.01)
*B60W 30/18* (2012.01)
*B60W 40/04* (2006.01)
*B60W 50/00* (2006.01)

(52) U.S. Cl.
CPC ...... *B60W 30/18009* (2013.01); *B60W 40/04* (2013.01); *B60W 50/0097* (2013.01); *G08G 1/012* (2013.01); *G08G 1/0116* (2013.01); *G08G 1/0125* (2013.01); *B60W 2520/10* (2013.01); *B60W 2540/10* (2013.01); *B60W 2540/12* (2013.01); *B60W 2540/16* (2013.01); *B60W 2540/18* (2013.01); *B60W 2554/406* (2020.02); *B60W 2554/408* (2020.02); *B60W 2554/80* (2020.02); *B60W 2556/50* (2020.02)

(58) Field of Classification Search
CPC .......... B60W 2710/08; B60W 30/143; B60W 30/18009; B60W 30/181; B60W 30/18127; B60W 30/18154; B60W 20/12; B60W 20/16; B60W 2520/10; B60W 2554/406; B60W 2554/408; B60W 2554/80; B60W 2554/801; B60W 2555/60; B60W 2556/50; B60W 2556/55; B60W 2710/18; B60W 10/18; B60W 2720/10; B60W 50/0097; G08G 1/0116; G08G 1/012; G08G 1/0125; G08G 1/0133; G08G 1/0141; G08G 1/096725; Y02T 10/84; Y02T 10/40
USPC .......................................................... 701/36
See application file for complete search history.

(56) References Cited

U.S. PATENT DOCUMENTS

| | | | | |
|---|---|---|---|---|
| 2003/0029406 | A1 | 2/2003 | Weiss .......................... | 123/179.4 |
| 2013/0110316 | A1* | 5/2013 | Ogawa .............. | G08G 1/096725 701/1 |
| 2015/0066350 | A1* | 3/2015 | Iwata ............... | G08G 1/096716 701/400 |
| 2016/0203717 | A1* | 7/2016 | Ginsberg ......... | G08G 1/096883 701/117 |
| 2016/0229402 | A1 | 8/2016 | Morita et al. ................... | 701/96 |
| 2016/0280224 | A1* | 9/2016 | Tatourian ......... | G08G 1/096741 |
| 2016/0284212 | A1* | 9/2016 | Tatourian ......... | G08G 1/096775 |
| 2017/0032402 | A1* | 2/2017 | Patsiokas ........... | G06Q 30/0207 |
| 2017/0248441 | A1* | 8/2017 | Heimrath .......... | B60W 50/0097 |
| 2018/0281810 | A1* | 10/2018 | Tochioka .............. | B60W 40/09 |
| 2019/0156266 | A1* | 5/2019 | Hubbard ................. | G01P 1/122 |
| 2019/0256096 | A1* | 8/2019 | Graf ...................... | B60W 10/18 |
| 2019/0382029 | A1* | 12/2019 | Golov ....................... | B60T 7/18 |
| 2021/0031780 | A1* | 2/2021 | Narayanasamy ............................ G08G 1/096783 |
| 2021/0088784 | A1* | 3/2021 | Whitmire ............. | G02B 27/017 |
| 2021/0122392 | A1* | 4/2021 | Berger ............. | B60W 60/0017 |
| 2021/0197801 | A1* | 7/2021 | Oh ........................ | G05D 1/0214 |
| 2021/0201680 | A1* | 7/2021 | Oh ...................... | G08G 1/09685 |
| 2021/0253128 | A1* | 8/2021 | Nister ............... | B60W 60/0027 |
| 2021/0354729 | A1* | 11/2021 | Ng .................... | B60W 60/0018 |

FOREIGN PATENT DOCUMENTS

| | | | |
|---|---|---|---|
| DE | 10 2009 042 309 A1 | 4/2010 | ............ F02D 17/00 |
| DE | 10 2009 050 520 A1 | 4/2011 | ............ F02D 45/00 |
| DE | 10 2011 079 899 A1 | 1/2013 | ............... G08G 1/07 |
| DE | 10 2011 081 609 A1 | 2/2013 | ........... B60W 30/14 |
| DE | 10 2012 211 420 A1 | 5/2014 | ............ F02D 45/00 |
| DE | 10 2014 203 212 A1 | 8/2015 | ............... G08G 1/01 |
| DE | 10 2014 006 551 A1 | 11/2015 | ............ G08G 1/081 |
| DE | 10 2014 216 269 A1 | 2/2016 | ........... B60W 30/16 |
| DE | 10 2015 005 902 A1 | 2/2016 | ........... B60W 10/04 |
| DE | 11 2013 007 677 T5 | 9/2016 | ........... B60W 30/17 |
| DE | 10 2015 214 538 A1 | 2/2017 | ................ B60L 7/18 |
| DE | 10 2009 042 309 B4 | 12/2019 | ............ F02N 15/00 |
| FR | 3 045 545 A1 | 6/2017 | ........... B60W 30/18 |
| GB | 2 452 835 A | 3/2009 | ............ G08G 1/0967 |
| JP | 2011-095828 A | 5/2011 | ............. B60R 21/00 |
| WO | 2019/072959 A1 | 4/2019 | ........... B60W 20/12 |

OTHER PUBLICATIONS

International Search Report and Written Opinion, Application No. PCT/EP2018/077717, 15 pages, dated Jan. 21, 2019.

* cited by examiner

DETERMINING THE POSITION OF A LATER STOPPING POINT OF A VEHICLE

CROSS-REFERENCE TO RELATED APPLICATIONS

This application is a U.S. National Stage Application of International Application No. PCT/EP2018/077717 filed Oct. 11, 2018, which designates the United States of America, and claims priority to DE Application No. 10 2017 218 229.9 filed Oct. 12, 2017, the contents of which are hereby incorporated by reference in their entirety.

TECHNICAL FIELD

The present disclosure relates to vehicle navigation. Various embodiments may include driver assistance systems for a vehicle for determining the position of a later stopping point of the vehicle, servers for such a driver assistance system, vehicles having such a driver assistance system, methods for determining the position of a later stopping point of a vehicle at an infrastructure device, program elements and/or computer-readable media.

BACKGROUND

In automotive development, the focus is increasingly aimed at digitizing and enhancing the efficiency of the vehicle in the driving mode. This can be effected, inter alia, by means of networked systems and by adapting the operating strategy of the vehicle to the respective situation. In electric or hybrid vehicles in particular, there are numerous possible ways of intervening in the operating strategy of the vehicle or of changing or varying the operating strategy and providing an optimized operating strategy, with the result that the consumption or the emissions is/are minimized or the range is maximized. The comfort for the driver or the user of the vehicle can also be enhanced by means of the adapted operating strategy.

SUMMARY

The teachings of the present disclosure may be employed to make vehicle operation more efficient and to reduce the environmental impact of the vehicle. For example, some embodiments include a driver assistance system (10) for a vehicle (20) for determining the position of a later stopping point (60) of the vehicle (20) at an infrastructure device (40), having: a control unit (11); a communication device (12) for receiving data from a server (30) or from the infrastructure device (40); and a sensor arrangement (13) for capturing vehicle data or environmental data, wherein the control unit (11) is configured to determine the later stopping point (60) of the vehicle (20) at the infrastructure device (40) on the basis of the data from the sensor arrangement and the data from the server (30) or from the infrastructure device (40) which are received by the communication device (12).

In some embodiments, the control unit (11) is configured to adapt the operating strategy of the vehicle (20) on the basis of the determined position of the later stopping point (60).

In some embodiments, the speed of the vehicle (20), the braking point, the braking force, the lane to be used and/or the recuperation power depend(s) on the selected operating strategy.

In some embodiments, the data from the server (30) or from the infrastructure device (40) which are received by the communication device (12) are infrastructure data, wherein the infrastructure data (40) comprise the traffic volume, the maximum or average tailback length, the maximum speed, the average speed or the duration of the red and/or green phase.

In some embodiments, the vehicle data and/or environmental data comprise the distance to the vehicle (50) traveling in front, the speed, the gas pedal position, the brake pedal position, the current gear, the current position, the steering angle, the relative speed with respect to the vehicle traveling in front or the driving behavior of the driver.

In some embodiments, the communication device (12) is configured to interchange data in a bidirectional manner with the server (30) and/or with the infrastructure device (40) via WLAN, Bluetooth, LTE, UMTS and/or 5G.

In some embodiments, the server (30) is configured to create a forecast for future infrastructure data on the basis of the current infrastructure data and the previous infrastructure data.

Some embodiments include a vehicle (20) having a driver assistance system (10) as described above.

Some embodiments include a method for determining the position of a later stopping point of a vehicle at an infrastructure device, having the steps of: capturing (S1) vehicle data or environmental data by means of a sensor arrangement; receiving (S2) infrastructure data from a server or from the infrastructure device by means of a communication device; and determining (S3) the position of the later stopping point of the vehicle at the infrastructure device on the basis of the vehicle data or the environmental data and the infrastructure data from the server or from the infrastructure device which are received by the communication device.

Some embodiments include a program element which, when executed on a control unit of a driver assistance system, instructs the driver assistance system to carry out a method as described above.

Some embodiments include a computer-readable medium on which a program element as described above is stored.

Some embodiments include a method for capturing a tailback length at an infrastructure device (40) by means of a sensor on the infrastructure device (40) or under a road.

In some embodiments, the sensor device is a camera for monitoring traffic or a conductor or induction loop under the road.

Some embodiments include a method for determining, predicting or estimating a tailback length at an infrastructure device (40) on the basis of a traffic flow and a duration of a red phase and/or a green phase.

Some embodiments include a method for forecasting a tailback length at an infrastructure device (40) using a prediction model on a control unit.

Some embodiments include a method for collecting and storing information relating to tailback lengths at an infrastructure device (40), which was captured, determined, estimated or predicted using a method as described above, on a server (30).

Some embodiments include a method for forecasting future tailback lengths at an infrastructure device (40) on the basis of data from the past.

Some embodiments include a method for transmitting stored, determined or forecast tailback lengths at an infrastructure device (40) to a communication system of a vehicle (20).

BRIEF DESCRIPTION OF THE DRAWINGS

Further features, advantages, and possible applications of the teachings herein emerge from the description of the exemplary embodiments and the figures that follows. The figures are schematic and not to scale. If the same reference signs are specified in the description of the figures that follows, they denote identical or similar elements.

DETAILED DESCRIPTION

Figure 1:
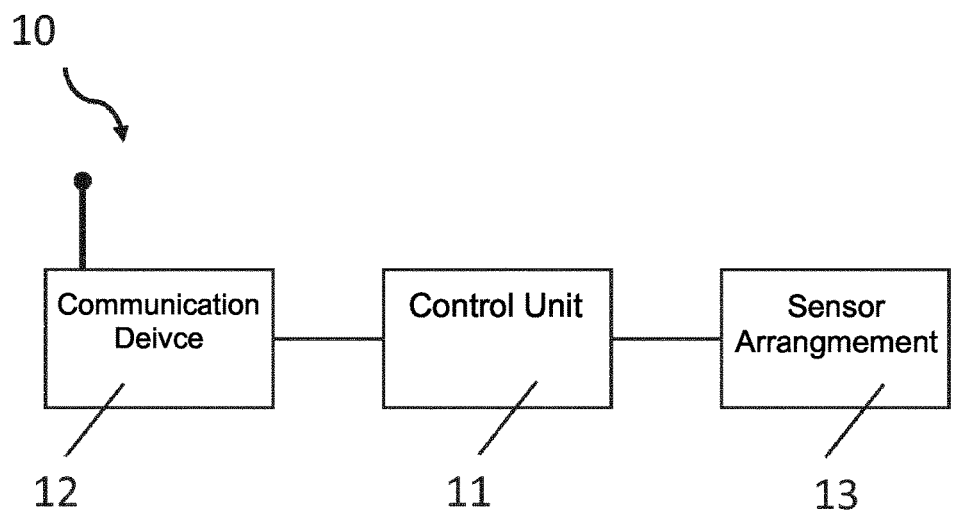
FIG. 1 shows a block diagram of a driver assistance system for determining the position of a later stopping point of a vehicle at an infrastructure device, the system incorporating teachings of the present disclosure.

The teachings of the present disclosure may be used in a driver assistance system for a vehicle for determining the position of a later stopping point of the vehicle at an infrastructure device. In some embodiments, the driver assistance system has a control unit, a communication device and a sensor arrangement. The communication device is configured to receive data, in particular infrastructure data, from a server or from the infrastructure device, and the sensor arrangement is configured to capture vehicle data or environmental data. The control unit is also configured to determine, calculate or predict the later stopping point of the vehicle at the infrastructure device on the basis of the data from the sensor arrangement and the data from the server and/or from the infrastructure device which are received by the communication device. The control unit can also be configured to capture and/or analyze the individual driving behavior of the user during a process of approaching the infrastructure device. For this purpose, the control unit can evaluate the sensor signals from the sensor arrangement of the vehicle.

The determination of the position of the later stopping point of a vehicle at an infrastructure device can be used as relevant information for operating the vehicle. This applies, in particular, with regard to the efficiency of the vehicle, the emissions of the vehicle, the wear and tear of vehicle parts and the noise pollution. The driver assistance system described above and below can already determine, calculate or predict, in good time, the later stopping point of the vehicle at the infrastructure device on the basis of vehicle data, environmental data and data from the server or from the infrastructure device. The determination can also be updated, validated and/or refined when approaching the position of the later stopping point.

In some embodiments, the vehicle data or the environmental data can be captured by a sensor arrangement, for example a radar sensor, a lidar sensor, an ultrasonic sensor, a camera, a laser scanner or a GPS sensor. The data from the server or from the infrastructure device, in particular infrastructure data, can be received by the communication device of the driver assistance system. The driver assistance system can instruct the vehicle or the driver of the vehicle appropriately on the basis of the position of the later stopping point. In other words, the driver assistance system can instruct the driver to remove his foot from the gas pedal, or the driver assistance system decouples the drive train (including the transmission) from the internal combustion engine or uses the engine brake for deceleration.

In some embodiments, the position of the later stopping point of a vehicle at an infrastructure device can also be determined iteratively, with the result that the determination is continuously updated in order to continuously make the determination of the position more precise, to refine or validate it. For example, in the case of an anticipatory driving style, a rise in the brake pedal position indicates an early stopping point of the vehicle. Vehicles may accumulate, in particular at infrastructure devices, for example traffic light systems, with the result that the position of the infrastructure device does not correspond to the position of the later stopping point of the vehicle at this infrastructure device. Furthermore, the duration of the red phase and the tailback length may influence the position of the later stopping point of the vehicle.

In some embodiments, the determination of the position of the later stopping point of a vehicle at the infrastructure unit may provide for the position of the later stopping point to be determined already several hundred meters before the actual standstill of the vehicle. In other words, it is possible to determine, for example 400 meters in front of a red traffic light system (traffic lights), that the position of the later stopping point will be 80 meters in front of this traffic light system. This position of the later stopping point of the vehicle can therefore be indicated to the user or the vehicle and the user or the vehicle can be instructed appropriately. Furthermore, the driver assistance system can iteratively refine the determination of the position of the later stopping point, the closer the vehicle comes to the determined position of the later stopping point.

In some embodiments, the driver assistance system can have the advantage of fewer harmful emissions, such as $CO_2$, CO, NOx or fine dust, as a result of a reduced fuel consumption since the internal combustion engine can change to the overrun cut-off or can be switched off earlier as a result of the adapted operating strategy. Furthermore, the brake abrasion can also be reduced since braking energy can be produced by the internal combustion engine or by an electric motor. Furthermore, the noise emission can be reduced since the internal combustion engine can be switched off earlier. All of these reasons result in a more comfortable driving sensation for the user or the occupants of the vehicle having the driver assistance system described above and below.

In some embodiments, the infrastructure device may be all devices in road traffic at which a position of a later stopping point of a vehicle can be determined or at which the traffic accumulates or the vehicle comes to a standstill. For example, the infrastructure device may be a traffic light system (traffic lights), a railroad crossing, a stop sign, an entrance to a roundabout, a major road, roadworks, a border crossing, a toll station, a tunnel, a loading station for a train or a ferry terminal.

In some embodiments, the control unit can use a prediction model to determine the position of the later stopping point of the vehicle at an infrastructure device. The input variables for this prediction model can be received, captured or provided by the communication device and/or the sensor arrangement. For example, the prediction model can determine, estimate or predict the duration of the red and/or green phase. The control unit or the prediction model on the control unit can also determine or predict the tailback length. In some embodiments, provision may be made for the maximum tailback length to be able to be determined. For this purpose, an external sensor may also be provided on the infrastructure device or under the road and may be used, for example a camera for monitoring traffic or a conductor or induction loop. Provision may also be made for the tailback length to also be able to be determined, predicted or estimated from the traffic flow and the duration of the red and/or green phase, for example by determining or predicting how many vehicles would pass the infrastructure device during the red phase.

In some embodiments, the data or the values from the communication device or from the sensor unit can be used directly, or else the gradients, average values or changes thereof in particular route sections or periods of time can be used. The control unit can also infer or determine the expected tailback length from the maximum tailback length and the duration of the red phase which has already elapsed. It is noted that it is also possible to distinguish the different lanes in front of the infrastructure device if there are a plurality of lanes. For example, it may be known that the left-hand lane has a tailback, but the right-hand lane does not.

In some embodiments, multivariate methods which combine various input variables and use them to determine a prediction value, for example the position of the later stopping point at an infrastructure device, come into consideration for the prediction model. Regression models, machine learning methods, such as support vector machines or neural networks, are also suitable for the prediction model. They can be continuously trained, with the result that they increasingly adapt to the individual driving behavior of the user, for example by analyzing the pedal positions in the case of an anticipatory driving style of the user. In other words, the individual driving behavior of the user can be analyzed. The prediction model can depend on and/or be influenced, in particular, by the weather, the time, the date, the season, the visibility conditions, the traffic density or the current operating strategy.

In some embodiments, the infrastructure data may already be provided in the map material of the driver assistance system, in the form of digital maps. The term "digital maps" or "digital map data" is also intended to be understood to mean maps for advanced driver assistance systems (ADASs), without navigation taking place.

In some embodiments, the control unit is configured to adapt the operating strategy or the trajectory planning of the vehicle on the basis of the determined position of the later stopping point. In hybrid vehicles or electric vehicles in particular, the operating strategy may be an essential contribution to reducing the consumption or the emissions or to increasing the range. As a result of energy-optimized operation or as a result of the adapted operating strategy, the vehicle having the driver assistance system described above and below can already stop the injection into an internal combustion engine in good time, can coast it, can switch off the internal combustion engine or can increase the recuperation power of the electric motor, with the result that electrical energy can be obtained from the braking operation. The operating strategy can also provide for an increased braking energy to be provided, for example, by increasing the air-conditioning power or the alternator, with the result that the kinetic energy of the vehicle can be advantageously used.

In some embodiments, the speed of the vehicle, the braking point, the braking force, the lane to be used and/or the recuperation power depend(s) on the selected operating strategy. In other words, the operating strategy of the vehicle can intervene in many vehicle systems and can vary or change corresponding vehicle parameters in order to ensure energy-efficient operation or comfortable operation. Furthermore, the adapted operating strategy can result in an improvement in the traffic flow since the reduction in the speed of the vehicle, that is to say the deceleration, can be effected less abruptly and the following vehicle must therefore also decelerate less abruptly.

In some embodiments, the indicator signals and data from the steering angle sensor can be used to detect a lane change and therefore to select data at the infrastructure device with lane accuracy. Furthermore, the individual driving behavior of the user, for example the average distance to the vehicle traveling in front, the release of the gas pedal and the brake pedal actuation, can be taken into account when adapting the operating strategy.

In some embodiments, the data from the server or from the infrastructure device which are received by the communication device are infrastructure data. The infrastructure data comprise the traffic volume, the maximum and average tailback length, the maximum speed, the average speed or the duration of the red and/or green phase.

In some embodiments, a multiplicity of different input data can be used to determine the position of the later stopping point of the vehicle. In particular, the communication device of the driver assistance system can receive the current traffic volume, the current tailback length at the corresponding infrastructure device, the permissible maximum speed, the average speed of the vehicles and/or the duration of the red and/or green phase. These data can be centrally collected and managed by a server, for example. Furthermore, the server can forecast or predict future data on the basis of the collected data from the past and can transmit these forecast infrastructure data to the communication device of the driver assistance system. In particular, the time, the date, the day of the week, the season, the current or expected visibility conditions (for example fog) or the current or expected environmental conditions (for example black ice) can be included in the forecast or prediction of the infrastructure data.

In some embodiments, the communication device can also receive infrastructure data from the infrastructure device itself or from sensors on this infrastructure device. For this purpose, a sensor, such as a conductor or induction loop, can be integrated in the road, for example, or a camera can evaluate the traffic and the traffic flow.

In some embodiments, the vehicle data and/or environmental data comprise the distance to the vehicle traveling in front, the speed, the gas pedal position, the brake pedal position, the current gear, the current position, the steering angle, the relative speed with respect to the vehicle traveling in front or the driving behavior of the driver.

In some embodiments, in addition to the infrastructure data from the server or from the infrastructure device, vehicle data or environmental data from the sensor arrangement can also be included in the determination of the position of the later stopping point of the vehicle. The vehicle having the driver assistance system may have a multiplicity of sensors, for example a camera, a GPS sensor, a radar sensor, an ultrasonic sensor, a laser scanner or a lidar sensor. With the aid of these sensors, the driver assistance system can determine the distance to the vehicle traveling in front, the speed or, to a certain extent, the traffic volume, for example by means of shadows cast by the vehicles traveling in front. The driver assistance system can also increase the power of the alternator or of the air-conditioning compressor with slight actuation of the brake pedal or can increase the recuperation power of the electric motor in order to decelerate the vehicle without actuating the service brake. This makes it possible to reduce the brake wear and therefore the brake dust. GPS is representative of all global navigation satellite systems (GNSSs), e.g. GPS, Galileo, GLONASS (Russia), Compass (China), IRNSS (India).

In some embodiments, the position of the vehicle can also be determined by means of cell positioning. This is possible, in particular, when using GSM, UMTS or 4G networks. In some embodiments, the communication device is configured to interchange data in a bidirectional manner with the server and/or with the infrastructure device via WLAN, Bluetooth, LTE, UMTS and/or 5G.

In some embodiments, the wireless transmission or the wireless reception of the update data takes place by Bluetooth, WLAN (e.g. WLAN 802.11a/b/g/n or WLAN 802.11p), ZigBee or WiMax or else cellular radio systems such as GPRS, UMTS or LTE. It is also possible to use other transmission protocols. The cited protocols provide the advantage of the standardization that has already taken place. The communication between the vehicle or the communication device in the vehicle and the infrastructure device can also be referred to as C2X communication (motor vehicle-to-infrastructure communication).

In some embodiments, the communication device can also communicate and interchange data with other vehicles; this can also be referred to as C2C communication (motor vehicle-to-motor vehicle communication). In particular, relevant data for determining the position of the later stopping point of a vehicle at an infrastructure device can be interchanged between vehicles via C2C. The basis for such C2C or C2X communication may be wireless communication systems in the form of WLANs or mobile radio.

Some embodiments include a server for a driver assistance system described above and below. The server is configured to create a forecast for future infrastructure data on the basis of the current infrastructure data and the previous infrastructure data. The data from the infrastructure devices, that is to say the infrastructure data, can be centrally collected or stored on a server, for example. This server can then transmit the corresponding data to the driver assistance system.

In some embodiments, the driver assistance system can itself transmit data to the server in order to improve the quality of the infrastructure data or to update the latter. In other words, bidirectional data interchange between the communication device of the driver assistance system and the server is provided. Furthermore, the server can organize or evaluate the infrastructure data according to the date, the time, the season, the visibility conditions and/or the environmental influences. The server can also determine, calculate or predict future expected data on the basis of the received data. Mathematical or statistical methods, for example, or else machine learning methods can be used for this purpose, with the result that the infrastructure data can be determined or forecast as precisely as possible. These infrastructure data are in turn included in the determination of the position of the later stopping point of the vehicle at the infrastructure device. It should be noted that the server can also be provided by a plurality of networked servers or a cloud.

Some embodiments include a vehicle having a driver assistance system described above and below. The vehicle is, for example, a motor vehicle, such as an automobile, a bus or a truck, or else a rail vehicle or an aircraft, such as an airplane.

Some embodiments include a method for determining the position of the later stopping point of a vehicle at an infrastructure device. The method has the following steps of:
  capturing vehicle data or environmental data by means of a sensor arrangement;
  receiving infrastructure data from a server or from the infrastructure device by means of a communication device; and
  determining the position of the later stopping point of the vehicle at an infrastructure device on the basis of the vehicle data or the environmental data and the infrastructure data from the server or from the infrastructure device which are received by the communication device.

The individual steps of the method can be carried out in a parallel manner or sequentially. The order of the individual steps can also be changed. Furthermore, there can also be a longer period of time between the individual steps.

Some embodiments include a program element which, when executed on a control unit of a driver assistance system, instructs the driver assistance system to carry out the method described above and below.

Some embodiments include a computer-readable medium on which a program element is stored, which program element instructs the control unit of a driver assistance system to carry out the method described above and below.

Some embodiments include a method for capturing a tailback length at an infrastructure device by means of a sensor on the infrastructure device or under a road. The sensor device can be a camera for monitoring traffic or a conductor or induction loop under the road. On the other hand, the tailback length at an infrastructure device can be determined, predicted or estimated on the basis of a traffic flow and a duration of a red phase and/or a green phase.

Some embodiments include a method for forecasting a tailback length at an infrastructure device using a prediction model on a control unit. The information relating to tailback lengths can be stored on a server. Some embodiments include a method for collecting and storing information relating to tailback lengths at an infrastructure device, which was captured, determined, estimated or predicted using one of the methods described above, on a server. Future tailback lengths at an infrastructure device can be advantageously forecast on the basis of stored data from the past.

In some embodiments, stored, determined or forecast tailback lengths at an infrastructure device can be transmitted to a communication system of a vehicle. For example, this information can be used for the above-described method and driver assistance system for determining the position of a stopping point.

Further features and details as well as advantageous variants of the methods for capturing, storing or forecasting tailback lengths at an infrastructure device have already been described above in connection with the method and driver assistance system for determining the position of a stopping point.

FIG. 1 shows a block diagram of a driver assistance system 10. The driver assistance system 10 has a control unit 11, a communication device 12 and a sensor arrangement 13. The sensor arrangement 13 is configured to capture vehicle data or environmental data, for example by means of a laser scanner, a lidar sensor, a radar sensor, a camera or an ultrasonic sensor. The communication device is configured to receive data, in particular infrastructure data, from a server, an infrastructure device or a sensor on an infrastructure device. On the basis of the vehicle data or environmental data captured by the sensor arrangement 13 and the infrastructure data received by the communication device 12, the control unit 11 can determine the position of the later stopping point of a vehicle at the infrastructure device. A prediction model may be provided on the control unit 11 for this purpose. Furthermore, the driver assistance system 10 can adapt, change or vary the operating strategy of the vehicle on the basis of the determined position of the later stopping point of the vehicle at an infrastructure device.

Figure 2:
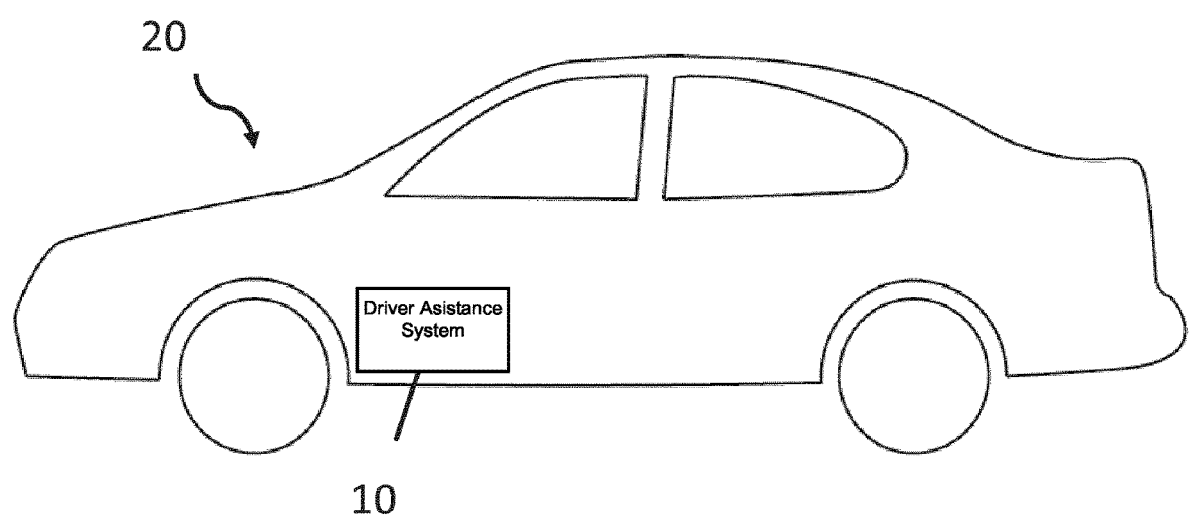
FIG. 2 shows a schematic illustration of a vehicle having such a driver assistance system incorporating teachings of the present disclosure.

FIG. 2 shows a schematic illustration of a vehicle 20 having a driver assistance system 10 for determining a position of a later stopping point at an infrastructure device. In this case, the driver assistance system 10 can access any sensors of the vehicle and can evaluate or use the data.

Figure 3:
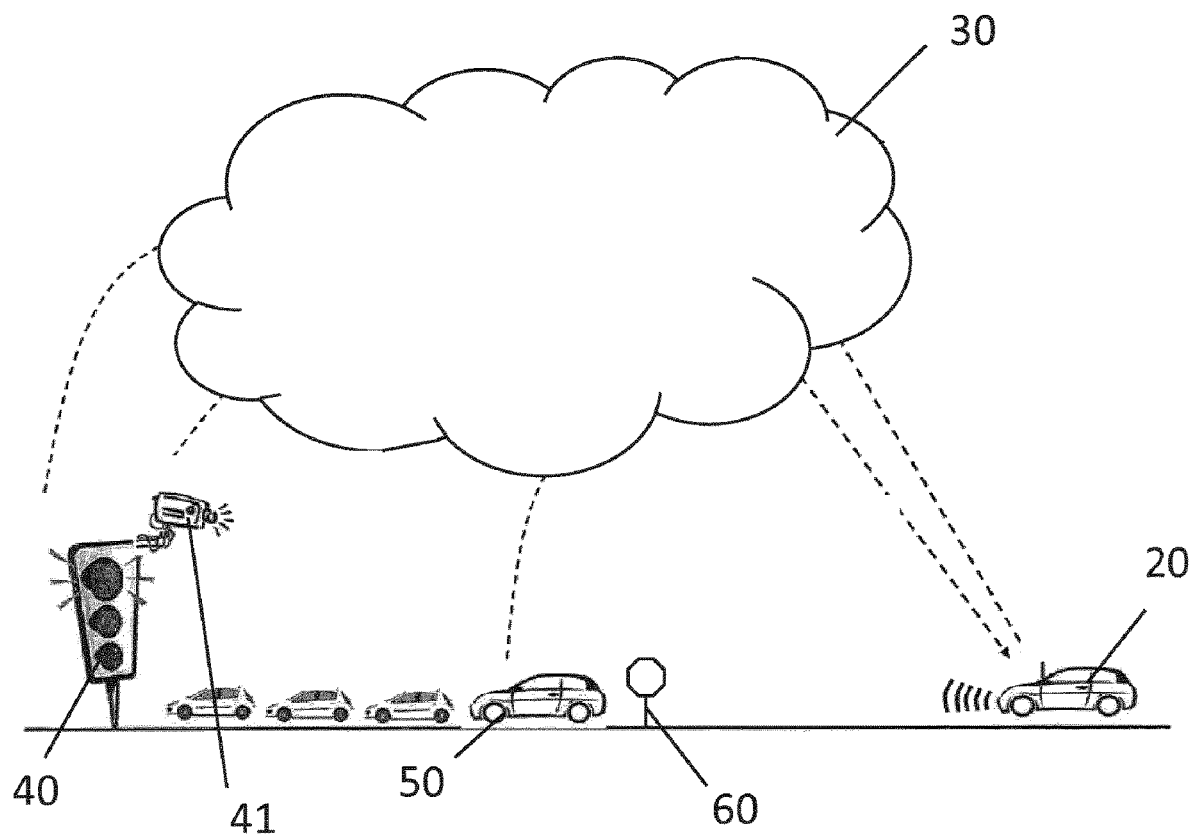
FIG. 3 shows a schematic illustration of a determination of the position of a later stopping point of a vehicle at an infrastructure device, such an infrastructure device, a vehicle having a driver assistance system and a server incorporating teachings of the present disclosure.

FIG. 3 shows a schematic illustration of the determination of the position of the later stopping point 60 of a vehicle 20 at an infrastructure device 40. FIG. 3 also shows a server 30 or a cloud 30. In the present case, the infrastructure device 40 is a traffic light system 40 (traffic lights); this traffic light system 40 has a sensor 41 for capturing the traffic flow, the traffic volume or the tailback length. In FIG. 3, the sensor 41 is a camera, but conductor or induction loops in the road can also be used as the sensor 41 for the infrastructure device 40. FIG. 3 also illustrates other road users 50 which influence the position of the later stopping point 60 of the vehicle 20.

All relevant data, in particular infrastructure data, can be collected and managed centrally on the server 30 or in the cloud 30. In other words, the infrastructure device 40, the sensor 41 of the infrastructure device 40, the other road user 50 and the vehicle 20 having the driver assistance system can interchange data with the server 30. This is represented by the dotted lines. In FIG. 3, the traffic light system 40 is in a red phase and other road users 50 are already in front of or at this traffic light system 40. Furthermore, the tailback length can be captured by the camera 41 of the traffic light system 40.

For example, the traffic light system 40 can transmit the information relating to the duration of the red phase, the camera 41 can transmit the tailback length and the other road user 50 can transmit its stopping point to the server 30. The server 30 in turn transmits all of these received or collected data to the vehicle 20 having the driver assistance system. The driver assistance system can use said data and the vehicle data or environmental data, which are captured by the sensor arrangement and are represented by the spreading "waves" in front of the vehicle 20, to determine the position of the later stopping point 60 of the vehicle 20. The later stopping point 60 of the vehicle 20 is illustrated by a "stop sign".

Furthermore, the server 30 can determine, calculate or predict future or expected data on the basis of the received data. The server 30 can also organize or classify the received data on the basis of the time, the date, the visibility conditions, the season, or the environmental conditions.

As a result of the determination of the later stopping point 60 of the vehicle 20 at the infrastructure device 40, the vehicle 20 having the driver assistance system can adapt its operating strategy or its trajectory planning, with the result that the emissions, the noise or the consumption is/are minimized and the comfort for the user is increased. For example, the recuperation energy, the generator load or the load of the air-conditioning compressor can be increased, or the internal combustion engine can be decoupled or can be actively used as the engine brake.

Figure 4:
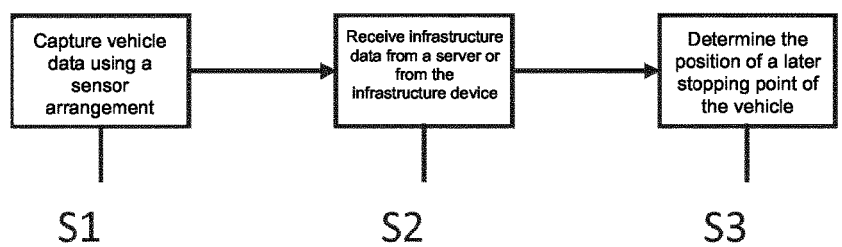
FIG. 4 shows a flowchart for a method for determining the position of a later stopping point of a vehicle at an infrastructure device incorporating teachings of the present disclosure.

FIG. 4 shows a flowchart for a method for determining the position of a later stopping point of a vehicle at an infrastructure device. In a first step S1, vehicle data or environmental data are captured by a sensor arrangement. In step S2, infrastructure data are received from a server or from the infrastructure device by a communication apparatus of a driver assistance system. In step S3, the position of the later stopping point of the vehicle at the infrastructure device is determined on the basis of the vehicle data or the environmental data and the infrastructure data from the server or from the infrastructure device which are received by the communication device. Statistical methods or machine learning methods can be used in this case.

What is claimed is:

1. A driver assistance system for determining the position of a stopping point of a vehicle at an infrastructure device, the system comprising:
   a control unit;
   a communication device for receiving data from a server or from the infrastructure device; and
   a sensor arrangement for capturing vehicle data or environmental data using at least one device selected from the group consisting of: a laser scanner, a lidar sensor, a radar sensor, a camera, or an ultrasonic sensor;
   wherein the control unit determines the location of the stopping point at the infrastructure device based at least in part on the data and the captured vehicle data or environmental data; and
   wherein the captured vehicle data or environmental data includes at least one datum selected from the group consisting of: a distance to a second vehicle travelling ahead of the vehicle, a current gear of the vehicle, a relative speed between the vehicle and the second vehicle, and a driving behavior of a driver of the vehicle.

2. The driver assistance system as claimed in claim 1, wherein the control unit modifies an operating strategy of the vehicle based at least in part on the determined position of the stopping point.

3. The driver assistance system as claimed in claim 2, wherein the selected operating strategy includes a speed of the vehicle, a braking point, a braking force, a lane to be used and/or a recuperation power.

4. The driver assistance system as claimed in claim 1, wherein:
   the data from the server or from the infrastructure device received by the communication device comprise infrastructure data; and
   the infrastructure data comprise a measure of traffic volume, a maximum or average tailback length, a maximum speed, an average speed, or a duration of a red and/or green phase of a traffic signal.

5. The driver assistance system as claimed in claim 1, wherein the vehicle data and/or environmental data further comprise at least one of: a speed of the vehicle, a gas pedal position, a brake pedal position, and a current position of the vehicle.

6. The driver assistance system as claimed in claim 1, wherein the communication device interchanges data in a bidirectional manner with the server and/or with the infrastructure device via WLAN, Bluetooth, LTE, UMTS, and/or 5G.

7. A vehicle comprising:
   a motor driving at least one wheel;
   a cabin for a driver; and
   a driver assistance system for determining the position of a stopping point of a vehicle at an infrastructure device, the system comprising:
   a control unit;
   a communication device for receiving data from a server or from the infrastructure device; and a sensor arrangement for capturing vehicle data or environmental data using at least one device selected from the group consisting of: a laser scanner, a lidar sensor, a radar sensor, a camera, or an ultrasonic sensor;

wherein the control unit determines the location of the stopping point at the infrastructure device based at least in part on the data and the vehicle data or environmental data; and wherein the captured vehicle data or environmental data includes at least one datum selected from the group consisting of: a distance to a second vehicle travelling ahead of the vehicle, a current gear of the vehicle, a relative speed between the vehicle and the second vehicle, and a driving behavior of a driver of the vehicle.

8. A method for determining a position of a stopping point of a vehicle at an infrastructure device, the method comprising:

capturing vehicle data or environmental data using at least one device selected from the group consisting of: a laser scanner, a lidar sensor, a radar sensor, a camera, or an ultrasonic sensor;

receiving infrastructure data from a server or from the infrastructure device using a communication device;

determining the position of the stopping point based at least in part on the captured vehicle data or the environmental data and the infrastructure data received by the communication device;

wherein the captured vehicle data or environmental data includes at least one datum selected from the group consisting of: a distance to a second vehicle travelling ahead of the vehicle, a current gear of the vehicle, a relative speed between the vehicle and the second vehicle, and a driving behavior of a driver of the vehicle.

* * * * *

UNITED STATES PATENT AND TRADEMARK OFFICE
CERTIFICATE OF CORRECTION

PATENT NO. : 11,475,765 B2
APPLICATION NO. : 16/754841
DATED : October 18, 2022
INVENTOR(S) : Stefan Grubwinkler It is certified that error appears in the above-identified patent and that said Letters Patent is hereby corrected as shown below:

On the Title Page

Item (12):
"Grubwinkier" ---Change to--- "Grubwinkler"

Item (72) Inventor:
"Stefan Grubwinkier, MUNICH (DE)... " ---Change to--- "... Stefan Grubwinkler, MUNICH (DE)..."

Signed and Sealed this
Twelfth Day of March, 2024

Katherine Kelly Vidal
*Director of the United States Patent and Trademark Office*